UNITED STATES PATENT OFFICE.

PETER MÜLLER, OF PITTSBURG, PENNSYLVANIA.

IMPROVEMENT IN COMPOSITIONS FOR DESTROYING VERMIN.

Specification forming part of Letters Patent No. 122,532, dated January 9, 1872.

SPECIFICATION.

*To all whom it may concern:*

Be it known that I, PETER MÜLLER, of Pittsburg, in the county of Allegheny and State of Pennsylvania, have invented a new and useful Improvement in Vermin-Exterminator; and I do hereby declare the following to be a full, clear, and exact description thereof.

My invention consists in the composition of a mixture of certain ingredients with which to attract house-vermin from the walls of houses, so that they can be taken and destroyed.

To enable others to make and use my invention, I will describe its composition and manner of use.

My composition consists in the following ingredients, combined in the proportions hereafter given, viz.: gum-arabic, three ounces; petroleum, crude, one-half an ounce; lavender oil, one half an ounce; and sugar, two pounds. These ingredients are thoroughly boiled together until they form a sirup. The sirup thus formed is applied when warm, by a paint-brush, as a varnish to a frame of basket-work, or to a piece of coffee-sacking or other like article having numerous interstices, although a frame of basket-work made of German willow is by far the best for the purpose. This frame, so treated, is placed in that part of a house which is infested with vermin, and the scent of the composition attracts the vermin from the walls to the frame, in the interstices of which they bury themselves and from which they may be shaken into the fire and destroyed.

The composition has an exceedingly pungent odor, which permeates all corners of a room and attracts the vermin from all quarters.

I do not confine myself to the exact proportions given, but I find they answer best for the purpose.

Any quantity of the composition may be made by simply increasing the quantity of the ingredients, but preserving their relative proportions.

What I claim as my invention, and desire to secure by Letters Patent, is—

The hereinbefore-described composition consisting of petroleum, gum-arabic, lavender oil, and sugar, in proportions specified, for the purposes set forth.

In testimony whereof I, the said PETER MÜLLER, have hereunto set my hand.

PETER MÜLLER.

Witnesses:
 THOS. B. KERR,
 W. N. PAXTON.

(98)